US008861338B2

(12) United States Patent
Lissianoi

(10) Patent No.: US 8,861,338 B2
(45) Date of Patent: Oct. 14, 2014

(54) ROUTED SPLIT MULTILINK TRUNKING FOR IPV6

(75) Inventor: Sergei Lissianoi, Billerica, MA (US)

(73) Assignee: Avaya Inc., Basking Ridge, NJ (US)

( * ) Notice: Subject to any disclaimer, the term of this patent is extended or adjusted under 35 U.S.C. 154(b) by 1033 days.

(21) Appl. No.: 12/826,770

(22) Filed: Jun. 30, 2010

(65) Prior Publication Data

US 2012/0002534 A1    Jan. 5, 2012

(51) Int. Cl.
*H04L 12/26* (2006.01)
*H04L 12/28* (2006.01)
*H04L 12/939* (2013.01)
*H04L 12/703* (2013.01)
*H04L 12/709* (2013.01)

(52) U.S. Cl.
CPC ............... *H04L 45/28* (2013.01); *H04L 45/245* (2013.01); *H04L 49/557* (2013.01)
USPC ............................ 370/225; 370/217; 370/401

(58) Field of Classification Search
USPC .................. 370/216–220, 225–228, 400–401
See application file for complete search history.

(56) References Cited

U.S. PATENT DOCUMENTS

| | | | |
|---|---|---|---|
| 8,166,187 B2 * | 4/2012 | Gowda et al. ................. | 709/230 |
| 8,213,430 B2 * | 7/2012 | Wakumoto .................... | 370/392 |
| 2003/0061533 A1 * | 3/2003 | Perloff et al. ..................... | 714/9 |
| 2003/0097470 A1 * | 5/2003 | Lapuh et al. .................. | 709/239 |
| 2005/0007951 A1 * | 1/2005 | Lapuh et al. .................. | 370/225 |
| 2006/0146697 A1 * | 7/2006 | Magret et al. ................. | 370/219 |
| 2007/0286094 A1 * | 12/2007 | Wigglesworth et al. ...... | 370/254 |
| 2009/0092043 A1 * | 4/2009 | Lapuh et al. .................. | 370/228 |

\* cited by examiner

*Primary Examiner* — Redentor Pasia
(74) *Attorney, Agent, or Firm* — Anderson Gorecki & Rouille LLP

(57) ABSTRACT

A method, apparatus and computer program product for performing routed split multilink trunking for IPv6 is presented. A first aggregation device is interconnected with a second aggregation device using an Inter Switch Trunk (IST). The first aggregation device learns a Media Access control (MAC) address of the second aggregation device and the second aggregation device learns a MAC address of the first aggregation device. Internet Protocol Version 6 (IPv6) addresses are synchronized between the first aggregation device and the second aggregation device. When the first or second aggregation device receives an IPv6 packet destined to the other aggregation device, the first or second aggregation device performs an IPv6 route lookup on a destination address of the IPv6 packet and forwards the packet to a next hop for the IPv6 packet.

15 Claims, 4 Drawing Sheets

ROUTED SPLIT MULTILINK TRUNKING FOR IPV6

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network elements are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc.

The packets are transferred across the network in accordance with a particular protocol, such as the Internet protocol (IP). Internet Protocol version 4 (IPv4) is the fourth revision in the development of the Internet Protocol (IP) and it is the first version of the protocol to be widely deployed. Together with IPv6, it is at the core of standards-based internetworking methods of the Internet. IPv4 is still by far the most widely deployed Internet Layer protocol.

IPv4 is a connectionless protocol for use on packet-switched Link Layer networks (e.g., Ethernet). It operates on a best effort delivery model, in that it does not guarantee delivery, nor does it assure proper sequencing, or avoid duplicate delivery. These aspects, including data integrity, are addressed by an upper layer transport protocol (e.g., Transmission Control Protocol).

IPv6 (Internet Protocol Version 6) is a set of specifications from the Internet Engineering Task Force (IETF) that are an upgrade of IP Version 4 (IPv4). The basics of IPv6 are similar to those of IPv4—devices can use IPv6 as source and destination addresses to pass packets over a network, and tools like ping work for network testing as they do in IPv4, with some slight variations.

One improvement in IPv6 over IPv4 is that IP addresses are lengthened from 32 bits to 128 bits. This extension anticipates considerable future growth of the Internet and provides relief for what was perceived as an impending shortage of network addresses. IPv6 also supports auto-configuration to help correct most of the shortcomings in version 4, and it has integrated security and mobility features.

Additional IPv6 features include support of source and destination addresses that are 128 bits (16 bytes) long, the use of Multicast Neighbor Solicitation messages to resolve IP addresses to link-layer addresses, the use of Multicast Listener Discovery (MLD) messages to manage membership in local subnet groups, and the use of ICMPv6 Router Solicitation and Router Advertisement messages to determine the IP address of the best default gateway.

Network devices may use MultiLink Trunks (MLTs) to communicate with each other. MLT is a method of link aggregation that allows multiple point-to-point links to be aggregated together in order to provide a single logical trunk. An MLT provides the combined bandwidth of the multiple links, as well as the physical layer protection against failure of any single link. Split MultiLink Trunk (SMLT) is MLT with one end of which is split between at least two aggregation devices.

Existing SMLT solution provides redundancy and fast failover at Layer 2 only—the peers exchange their Media Access Control (MAC) addresses but not their IPv6 addresses. The Virtual Router Redundancy Protocol (VRRP) v3 protocol uses a different mechanism for providing redundancy. VRRPv3 utilizes periodic advertisements that allow multiple routers to elect the single master which instantiates the redundant IPv6 and MAC addresses. Failover is achieved by electing a new master in situations when a certain number of advertisements fail to be received by the backup routers.

SUMMARY

Conventional mechanisms such as those explained above suffer from a variety of deficiencies. One such deficiency is in conventional SMLT the IPv6 forwarding logic is not modified from its normal behavior. In case of an aggregation node's failure IPv6 connectivity will not be restored until dynamic IPv6 routing re-converges or neighbor unreachability detection completes, thus sub-second recovery cannot be achieved. Moreover, in case the aggregation switches are used as default routers for IPv6 hosts the connectivity will not be restored until the new default router is assigned dynamically or through configuration.

Although the VRRPv3 protocol may in theory provide sub-second failover this can only be achieved by configuring a very short retransmission interval for VRRPv3 advertisement (at most 300 milliseconds, typically much less). This solution results in a multicast traffic overhead which in the case of multiple VRRPv3 VLANs sharing the same Ethernet segment can become significant. VRRPv3 solution involves a separate stand alone protocol, it requires explicit configuration of all the participating nodes whereas the RSMLT solution works at the IPv6 level and requires a single enable/disable configuration parameter. Load balancing with VRRPv3 requires a more complex configuration which involves all the IPv6 nodes on the same link. With IPv6 RSMLT the load balancing is done at the SMLT level (Layer 2), no additional configuration is required.

Embodiments of the invention significantly overcome such deficiencies and provide mechanisms and techniques that provide redundancy, improved load balancing and rapid (sub-second) failover for routed IPv6 (Internet Protocol Version 6) traffic in Split Multilink Trunking (SMLT) configurations. A typical SMLT configuration involves an edge node connecting over an MLT (Multi-Link Trunking) link to two SMLT aggregation nodes. In this configuration IPv6 data traffic from the edge node can be MLT-hashed to either of the two aggregation nodes. If an IPv6 packet is hashed to the node that is not the next hop gateway for the destination IPv6 address the packet will be bridged to its peer node and only then it will be IPv6 routed towards its ultimate destination. With this technology a node will perform IPv6 lookup and forwarding on behalf of its SMLT peer—even if the node is not the next hop gateway for the received IPv6 packets. This eliminates the extra bridging hop in the configuration described above improving the load balancing between the two aggregation nodes. In case of failure of one of the aggregation nodes the IPv6 traffic will continue to be forwarded by its peer. Furthermore, the network will experience only a brief service interruption as no routing or bridging re-convergence will be required. The proposed solution is applied at the IPv6 level and is therefore independent of the IPv6 routing protocol used.

In a particular embodiment of a method for performing routed split multilink trunking for IPv6, the method includes interconnecting a first aggregation device with a second aggregation device using an Inter Switch Trunk (IST), wherein the first aggregation device and the second aggregation device operate concurrently and function as a single device. The method also includes learning, by the first aggregation device, a Media Access Control (MAC) address of the second aggregation device and learning, by the second aggregation device, a MAC address of the first aggregation device. Additionally the method includes synchronizing Internet Protocol Version 6 (IPv6) addresses between the first aggregation device and the second aggregation device. When the first aggregation device receives an IPv6 packet destined to the second aggregation device the first aggregation device performs an IPv6 route lookup on a destination address of the IPv6 packet and forwards the packet to a next hop for the IPv6 packet, and when the second aggregation device receives an IPv6 packet destined to the first aggregation device the second aggregation device performs an IPv6 route lookup on a destination address of the IPv6 packet and forwards the packet to a next hop for the IPv6 packet.

Other embodiments include a computer readable medium having computer readable code thereon for providing routed split multilink trunking for Internet Protocol version 6 (IPv6). The medium includes instructions for learning, by a first aggregation device a Media Access Control (MAC) address of a second aggregation device, the first aggregation device interconnected with the second aggregation device using an Inter Switch Trunk (IST), wherein the first aggregation device and the second aggregation device operate concurrently and function as a single device. The computer readable medium also includes instructions for learning, by the second aggregation device a MAC address of the first aggregation device and synchronizing Internet Protocol Version 6 (IPv6) addresses between the first aggregation device and the second aggregation device. The term "synchronizing Ipv6 addresses" as used herein refers to the scenario wherein the first device learns the set of IPv6 addresses of the second device and wherein the second device learns the set of IPv6 addresses of the first device. The computer readable medium additional includes instructions wherein when the first aggregation device receives an IPv6 packet destined to the second aggregation device the first aggregation device performs an IPv6 route lookup on a destination address of the IPv6 packet and forwards the packet to a next hop for the IPv6 packet, and when the second aggregation device receives an IPv6 packet destined to the first aggregation device the second aggregation device performs an IPv6 route lookup on a destination address of the IPv6 packet and forwards the packet to a next hop for the IPv6 packet.

Still other embodiments include a computerized device (e.g. an aggregator), configured to process all the method operations disclosed herein as embodiments of the invention. In such embodiments, the computerized device includes a memory system, a processor, communications interface in an interconnection mechanism connecting these components. The memory system is encoded with a process that provides routed split multilink trunking for Ipv6 as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing routed split multilink trunking for IPv6 as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Logical connections between certain nodes are referred to herein as Inter-Switch Trunks (ISTs). ISTs may be physical links that extend from one network element to a neighboring network element in the cluster, or may be logical links that tunnel through one or more intermediate network elements within the cluster. The node that receives a packet from a non-IST port will be referred to as a local node. All other nodes within the cluster are referred to as remote nodes with respect to the received packet. When an IST is selected for use, the IST is selected on a rotational basis. This is done to prevent repeatedly selecting the same IST and is used in place of a hashing function.

Two or more links may be grouped to form a Multi-Link Trunk (MLT). Each MLT is assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped. Likewise, rather than designate a primary and backup port for each port in the MLT/SMLT, it would be advantageous to load share the packets across the remaining ports of the MLT/SMLT so that the packets may be distributed across the remaining ports that are UP. According to an embodiment, this process is implemented in hardware so that the fastpath (dataplane) can automatically accommodate individual and multiple port failures and automatically redirect packet traffic across the remaining ports in an equitable manner.

Figure 1:
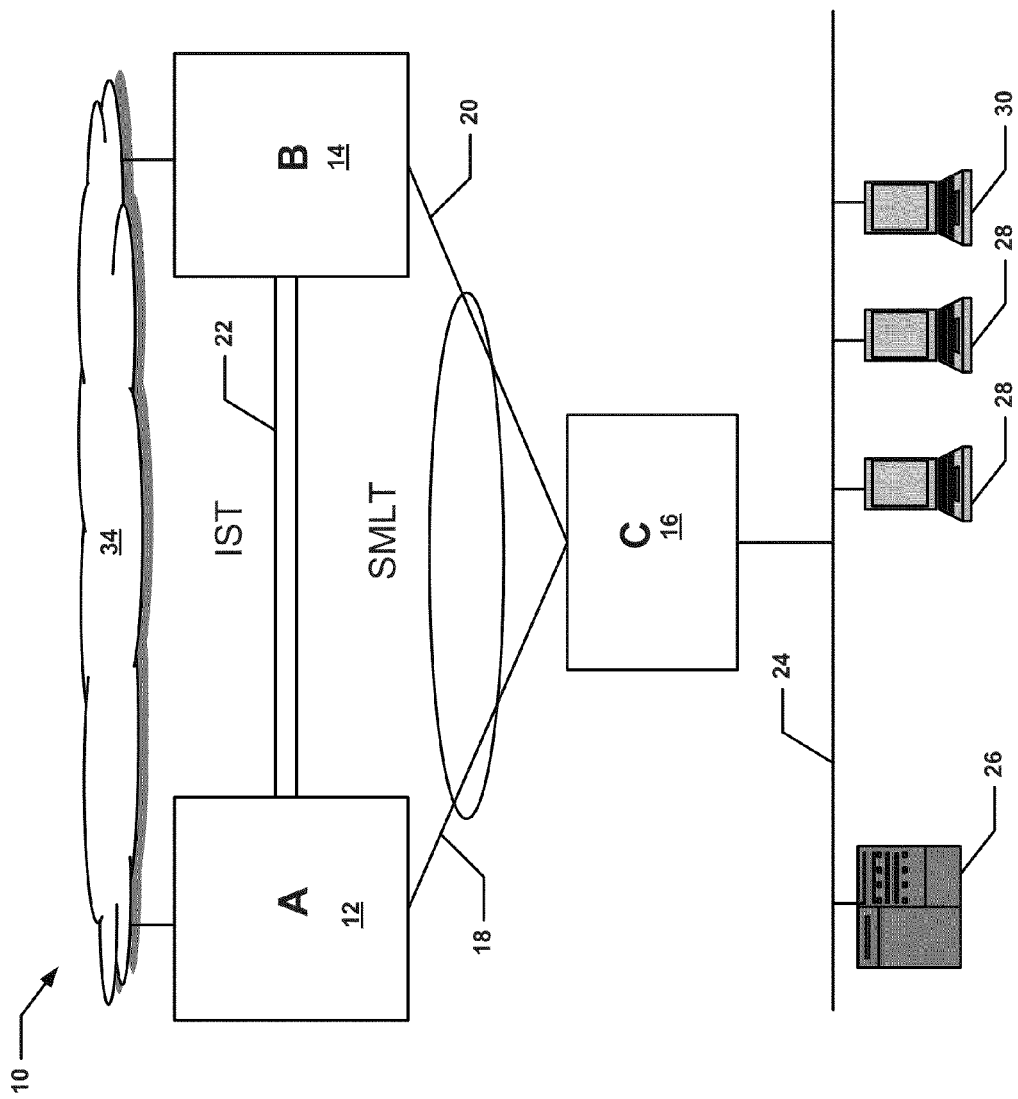
FIG. 1 is a block diagram showing an example split multilink trunk network in accordance with embodiments of the invention.

FIG. 1 shows another example way in which network elements may be interconnected. Specifically, in this example node A and node B are interconnected by an inter-switch trunk (IST) 26 which may be a single link or itself may be a multi-link trunk. When the links of a multilink trunk are physically connected to two different network elements, the MLT is called a Split Multi-Link Trunk (SMLT). Nodes A and B each have one or more links that connects to node C, which may be grouped together to form a SMLT 23. Thus, if node A has data (e.g. a frame/packet) to send to node C, node A may either select one of the SMLT links connected to it or may transmit the packet on one of the links associated with the Inter-Switch Trunk 26 to enable the node B to forward the data on one of its links associated with the SMLT to node C.

Nodes A and B serve as next hops for IPv6 routes learned or statically configured on node C and/or on IPv6 nodes on the network behind C. Redundancy at Layer 3 (i.e. IPv6) and sub-second failover is achieved by synchronizing IPv6 forwarding records on aggregation peer nodes A and B.

Aggregation peers A and B communicate with each other by means of messages sent over the IST link 22. Each node passes to the peer its MAC address and the set of IPv6 addresses and prefixes configured on the SMLT link. Upon learning its peer's MAC address an aggregation node modifies its IPv6 forwarding logic as follows. When receiving an IPv6 packet destined to its peer's MAC address the node will perform an IPv6 route lookup on the destination address and will forward the packet to the route's next hop (in the absence of this logic modification the packet would have been dropped or bridged to the peer). In the case of failure of one of the aggregation nodes, for example node B, the MLT functionality on node C will be able to detect this condition in well under a second and thus declare the C-B link to be down (this is regular MLT operation). As a result, all IPv6 traffic originated or forwarded by C will take the A-C path. Since it may take multiple seconds for dynamic IPv6 routing protocols to re-converge some IPv6 traffic may still be sent to B's MAC address as C and other nodes will retain stale IPv6 routes whose next hop remains to be node B. However, because of the forwarding logic modification described above this IPv6 traffic will be successfully forwarded by node A. As a result, the IPv6 will experience only a sub-second service interruption.

In addition to always performing IPv6 forwarding on behalf of the peer as described above an aggregation node will also terminate IPv6 on behalf of the peer in cases of peer node failure. A failure of the IST link or a total failure of one of the aggregation nodes is immediately detected by its peer through monitoring of the IST state; the following logic is applied. When a node detects an IST failure it modifies the local IPv6 forwarding and Neighbor Discovery records to terminate IPv6 traffic sent to any of the peer's IPv6 addresses configured on the SMLT link. The node also transmits unsolicited Neighbor Advertisement messages for all the peer's addresses and unsolicited Router Advertisement message for all the peer's prefixes. When the node receives any packet destined to one the peer's IPv6 addresses it will pass the packet to the local IPv6 protocol stack. Specifically, the node will fully emulate its peer's Neighbor Discovery operation: it will respond to Neighbor and Router Solicitations for peer's addresses and prefixes and will transmit unsolicited Neighbor and Router Advertisements as specified in the IPv6 Neighbor Discovery RFC; it will generate ICMPv6 events as described in the ICMPv6 RFC. As a result of this behavior the IPv6 hosts using nodes A or B as their default IPv6 routers will not need to rediscover or switch to a different default router in case of an aggregation node failure—this allows a subsecond failover for IPv6 host traffic.

Figure 2A:
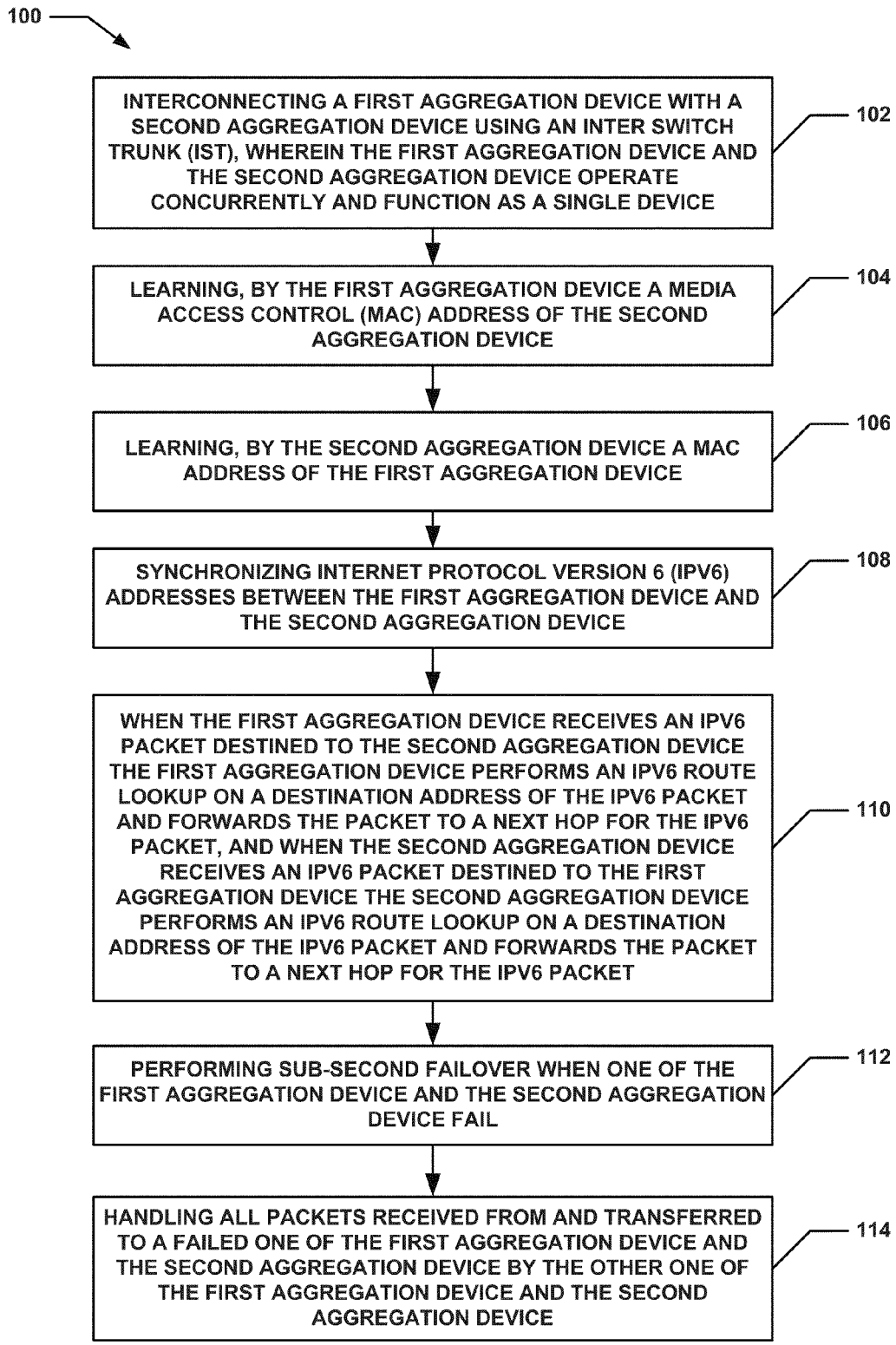
FIGS. 2A and 2B comprises a flow diagram illustrating a particular embodiment of a method for routed split multi-trunking for IPv6 in accordance with embodiments of the invention.
Figure 2B:
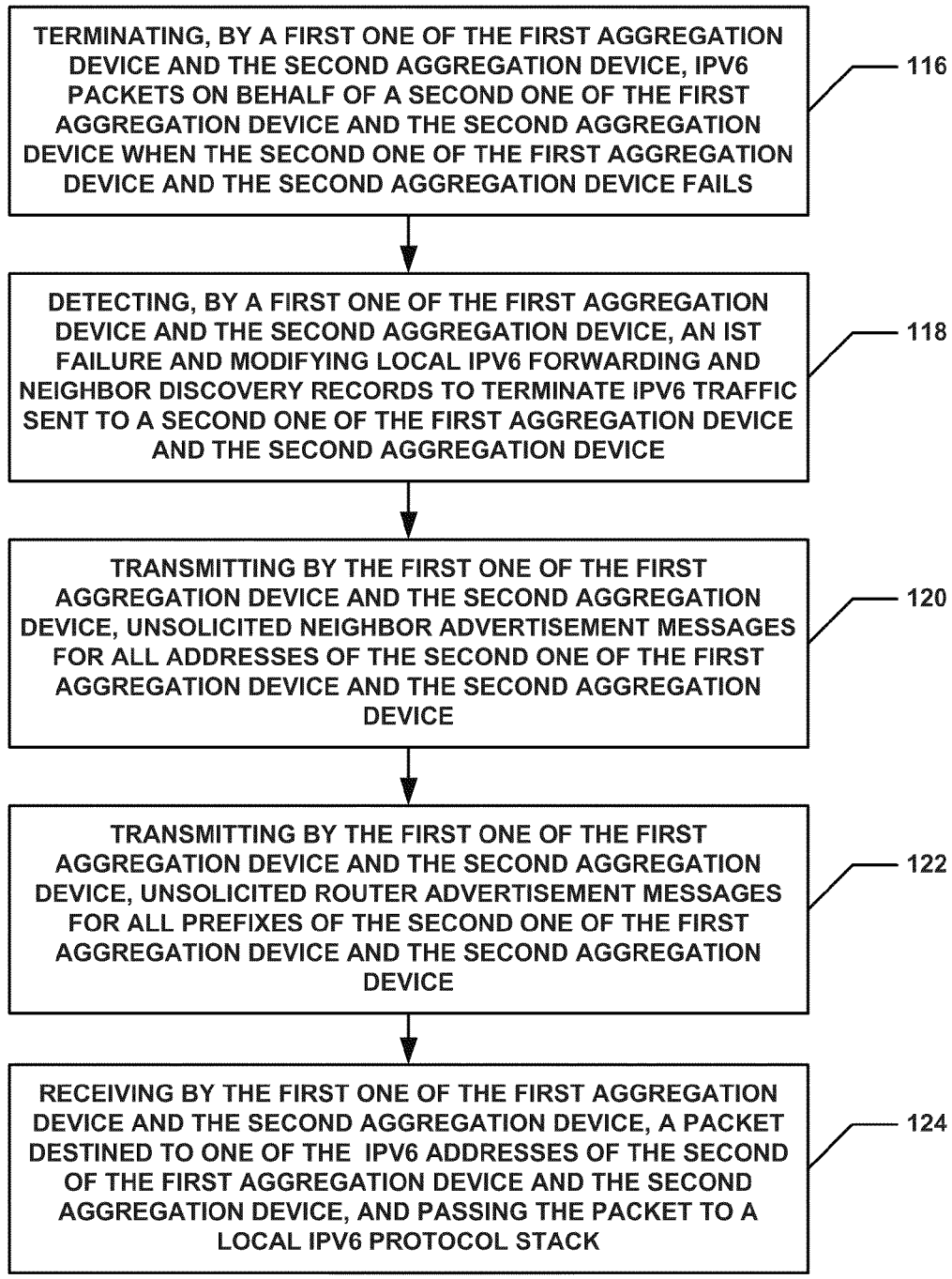

A flow chart of a particular embodiment of the presently disclosed method of performing routed split multilink trunking for IPv6 is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of performing routed split multilink trunking for IPv6 is shown. Method 100 begins with processing block 102 which discloses interconnecting a first aggregation device with a second aggregation device using an Inter Switch Trunk (IST), wherein the first aggregation device and the second aggregation device operate concurrently and function as a single device. The first aggregation device and the second aggregation device are aggregation peers and communicate with each other byway of an IST.

Processing block 104 states learning, by the first aggregation device, a Media Access control (MAC) address of the second aggregation device and processing block 106 recites learning, by the second aggregation device, a MAC address of the first aggregation device. Upon learning its peer's MAC address an aggregation node modifies its IPv6 forwarding logic. When receiving an IPv6 packet destined to its peer's MAC address the node will perform an IPv6 route lookup on the destination address and will forward the packet to the route's next hop.

Processing block 108 discloses synchronizing Internet Protocol Version 6 (IPv6) addresses between the first aggregation device and the second aggregation device. Processing block 110 states when the first aggregation device receives an IPv6 packet destined to the second aggregation device the first aggregation device performs an IPv6 route lookup on a destination address of the IPv6 packet and forwards the packet to a next hop for the IPv6 packet, and when the second aggregation device receives an IPv6 packet destined to the first aggregation device the second aggregation device performs an IPv6 route lookup on a destination address of the IPv6 packet and forwards the packet to a next hop for the IPv6 packet. Processing block 112 recites performing sub-second failover when one of the first aggregation device and the second aggregation device fail.

Processing block 114 discloses handling all packets received from and transferred to a failed one of the first aggregation device and the second aggregation device by the other one of the first aggregation device and the second aggregation device. In the case of failure of one of the aggregation nodes A and B, for example node B, the MLT functionality on node C will be able to detect this condition in well under a second and thus declare the C-B link to be down (this is regular MLT operation). As a result, all IPv6 traffic originated or forwarded by C to B will take the A-C path. Since it may take multiple seconds for dynamic IPv6 routing protocols to re-converge some IPv6 traffic may still be sent to B's MAC address as C and other nodes will retain stale IPv6 routes whose next hop remains to be node B. However, because of the forwarding logic modification described above this IPv6 traffic will be successfully forwarded by node A.

Processing continues with processing block 116 which states terminating, by a first one of the first aggregation device and the second aggregation device, IPv6 packets on behalf of a second one of the first aggregation device and the second aggregation device when the second one of the first aggregation device and the second aggregation device fails.

Processing block 118 recites detecting, by a first one of the first aggregation device and the second aggregation device, an IST failure and modifying local IPv6 forwarding and Neighbor Discovery records to terminate IPv6 traffic sent to a second one of the first aggregation device and the second aggregation device when the second device fails.

Processing block 120 discloses transmitting by the first one of the first aggregation device and the second aggregation device, unsolicited Neighbor Advertisement messages for all addresses of the second one of the first aggregation device and the second aggregation device when the second device fails.

Processing block 122 states transmitting by the first one of the first aggregation device and the second aggregation device, unsolicited Router Advertisement messages for all prefixes of the second one of the first aggregation device and the second aggregation device when the second device fails.

Processing block 124 recites receiving by the first one of the first aggregation device and the second aggregation device, a packet destined to one of the IPv6 addresses of the second of the first aggregation device and the second aggregation device, and passing the packet to a local IPv6 protocol stack. When a node detects an IST failure it modifies the local IPv6 forwarding and Neighbor Discovery records to terminate IPv6 traffic sent to any of the peer's IPv6 addresses configured on the SMLT link. When the node receives any packet destined to one the peer's IPv6 addresses it will pass the packet to the local IPv6 protocol stack. Specifically, the node will fully emulate its peer's Neighbor Discovery operation: it will respond to Neighbor and Router Solicitations for peer's addresses and prefixes and will transmit unsolicited Neighbor and Router Advertisements as specified in the IPv6 Neighbor Discovery RFC; it will generate ICMPv6 events as described in the ICMPv6 RFC. As a result of this behavior the IPv6 hosts using these nodes as their default IPv6 routers will not need to rediscover or switch to a different default router in case of an aggregation node failure—this allows a subsecond failover for IPv6 host traffic.

Figure 3:
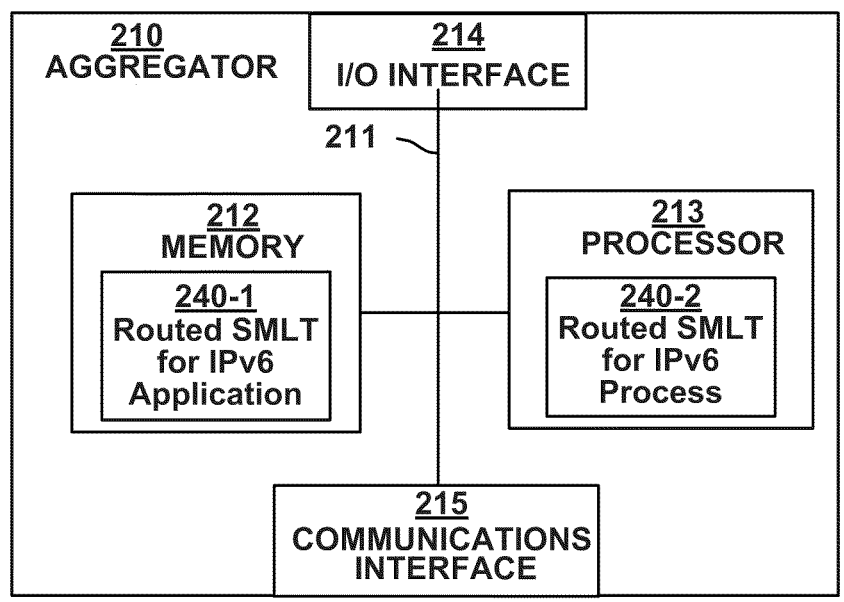
FIG. 3 illustrates an example computer system architecture for an aggregator that performs routed split multitrunking for IPv6 in accordance with embodiments of the invention.

FIG. 3 is a block diagram illustrating example architecture of a computer system (e.g. an aggregator) 210 that executes, runs, interprets, operates or otherwise performs routed SMLT trunking for IPv6 application 240-1 and routed SMLT trunking for IPv6 process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a Routed SMLT Trunking for IPv6 application 240-1 as explained herein. The Routed SMLT Trunking for IPv6 application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a Routed SMLT Trunking for IPv6 application 240-1. Execution of a Routed SMLT Trunking for IPv6 application 240-1 in this manner produces processing functionality in the Routed SMLT Trunking for IPv6 process 240-2. In other words, the Routed SMLT Trunking for IPv6 process 240-2 represents one or more portions or runtime instances of a Routed SMLT Trunking for IPv6 application 240-1 (or the entire a Routed SMLT Trunking for IPv6 application 240-1) performing or executing within or upon the processor 213 in the computerized device 210 at runtime.

It is noted that example configurations disclosed herein include the Routed SMLT Trunking for IPv6 application 240-1 itself (i.e., in the form of un-executed or non-performing logic instructions and/or data). The Routed SMLT Trunking for IPv6 application 240-1 may be stored on a computer readable medium (such as a floppy disk), hard disk, electronic, magnetic, optical, or other computer readable medium. A Routed SMLT Trunking for IPv6 application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a Routed SMLT Trunking for IPv6 application 240-1 in the processor 213 as the Routed SMLT Trunking for IPv6 process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the Routed SMLT Trunking for IPv6 application 240-1. Execution of Routed SMLT Trunking for IPv6 application 240-1 produces processing functionality in Routed SMLT Trunking for IPv6 process 240-2. In other words, the Routed SMLT Trunking for IPv6 process 240-2 represents one or more portions of the Routed SMLT Trunking for IPv6 application 240-1 (or the entire application) performing within or upon the processor 213 in the computer system 200.

It should be noted that, in addition to the Routed SMLT Trunking for IPv6 process 240-2, embodiments herein include the Routed SMLT Trunking for IPv6 application 240-1 itself (i.e., the un-executed or non-performing logic instructions and/or data). The Routed SMLT Trunking for IPv6 application 240-1 can be stored on a computer readable medium such as a floppy disk, hard disk, or optical medium. The Routed SMLT Trunking for IPv6 application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of Routed SMLT Trunking for IPv6 application 240-1 in processor 213 as the Routed SMLT Trunking for IPv6 process 240-2. Those skilled in the art will understand that the computer system 200 can include other processes and/or software and hardware components, such as an operating system that controls allocation and use of hardware resources associated with the computer system 200.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   interconnecting a first aggregation device with a second aggregation device using an Inter Switch Trunk (IST), wherein said first aggregation device and said second aggregation device operate concurrently and function as a single device;
   learning, by said first aggregation device a Media Access Control (MAC) address of said second aggregation device;
   learning, by said second aggregation device a MAC address of said first aggregation device;
   synchronizing Internet Protocol Version 6 (IPv6) addresses between said first aggregation device and said second aggregation device;
   when said first aggregation device receives an IPv6 packet destined to said second aggregation device said first aggregation device performs an IPv6 route lookup on a destination address of said IPv6 packet and forwards said packet to a next hop for said IPv6 packet, and when said second aggregation device receives an IPv6 packet destined to said first aggregation device said second aggregation device performs an IPv6 route lookup on a destination address of said IPv6 packet and forwards said packet to a next hop for said IPv6 packet, wherein each of the first aggregation device and second aggregation device performs the respective IPv6 route lookup when both the first aggregation device and second aggregation device are at the same time;
   detecting, by a first one of said first aggregation device and said second aggregation device, an IST failure and modifying local IPv6 forwarding and Neighbor Discovery records to terminate IPv6 traffic sent to a second one of said first aggregation device and said second aggregation device; and
   transmitting by said first one of said first aggregation device and said second aggregation device, unsolicited Router Advertisement messages for all prefixes of said second one of said first aggregation device and said second aggregation device.

2. The method of claim 1 further comprising performing sub-second failover when one of said first aggregation device and said second aggregation device fail.

3. The method of claim 2 further comprising handling all packets received from and transferred to a failed one of said first aggregation device and said second aggregation device by the other one of said first aggregation device and said second aggregation device.

4. The method of claim 2 further comprising terminating, by a first one of said first aggregation device and said second aggregation device, IPv6 packets on behalf of a second one of said first aggregation device and said second aggregation device when the second one of said first aggregation device and said second aggregation device fails.

5. The method of claim 1 further comprising receiving by said first one of said first aggregation device and said second aggregation device, a packet destined to one of said IPv6 addresses of said second of said first aggregation device and said second aggregation device, and passing said packet to a local IPv6 protocol stack.

6. A non-transitory computer readable storage medium having computer readable code thereon for routed split multilink trunking for Internet Protocol version 6 (IPv6), the non-transitory computer readable storage medium including instructions in which a computer system performs operations comprising:
   learning, by a first aggregation device a Media Access Control (MAC) address of a second aggregation device, said first aggregation device interconnected with said second aggregation device using an Inter Switch Trunk (IST), wherein said first aggregation device and said second aggregation device operate concurrently and function as a single device;
   learning, by said second aggregation device a MAC address of said first aggregation device;
   synchronizing Internet Protocol Version 6 (IPv6) addresses between said first aggregation device and said second aggregation device; and
   when said first aggregation device receives an IPv6 packet destined to said second aggregation device said first aggregation device performs an IPv6 route lookup on a destination address of said IPv6 packet and forwards said packet to a next hop for said IPv6 packet, and when said second aggregation device receives an IPv6 packet destined to said first aggregation device said second aggregation device performs an IPv6 route lookup on a destination address of said IPv6 packet and forwards said packet to a next hop for said IPv6 packet, wherein each of the first aggregation device and second aggregation device performs the respective IPv6 route lookup when both the first aggregation device and second aggregation device are fully operational at the same time;
   detecting, by a first one of said first aggregation device and said second aggregation device, an IST failure and instructions for modifying local IPv6 forwarding and Neighbor Discovery records to terminate IPv6 traffic sent to a second one of said first aggregation device and said second aggregation device; and
   transmitting by said first one of said first aggregation device and said second aggregation device, unsolicited Router Advertisement messages for all prefixes of said second one of said first aggregation device and said second aggregation device.

7. The non-transitory computer readable storage medium of claim 6 further comprising instructions for performing sub-second failover when one of said first aggregation device and said second aggregation device fail.

8. The non-transitory computer readable storage medium of claim 7 further comprising instructions for handling all packets received from and transferred to a failed one of said first aggregation device and said second aggregation device by the other one of said first aggregation device and said second aggregation device.

9. The non-transitory computer readable storage medium of claim 7 further comprising instructions for terminating, by a first one of said first aggregation device and said second aggregation device, IPv6 packets on behalf of a second one of said first aggregation device and said second aggregation device when the second one of said first aggregation device and said second aggregation device fails.

10. The non-transitory computer readable storage medium of claim 6 further comprising instructions for receiving by said first one of said first aggregation device and said second aggregation device, a packet destined to one of said IPv6 addresses of said second of said first aggregation device and said second aggregation device, and passing said packet to a local IPv6 protocol stack.

11. A system comprising:
    a first aggregation device and a second aggregation device, wherein each of said first and second aggregation devices comprises:
    a memory;
    a processor;
    a communications interface;
    an interconnection mechanism coupling the memory, the processor and the communications interface; and
    wherein the memory is encoded with an application providing routed split multilink trunking for Internet Protocol version 6 (IPv6), that when performed on the processor, provides a process for processing information, the process causing said first aggregation device and said second aggregation device to perform the operations of:

learning, by said first aggregation device, a Media Access Control (MAC) address of the second aggregation device, said first aggregation device interconnected with said second aggregation device using an Inter Switch Trunk (IST), wherein said first aggregation device and said second aggregation device operate concurrently and function as a single device;

learning, by said second aggregation device a MAC address of said first aggregation device;

synchronizing Internet Protocol Version 6 (IPv6) addresses between said first aggregation device and said second aggregation device;

when said first aggregation device receives an IPv6 packet destined to said second aggregation device said first aggregation device performs an IPv6 route lookup on a destination address of said IPv6 packet and forwards said packet to a next hop for said IPv6 packet, and when said second aggregation device receives an IPv6 packet destined to said first aggregation device said second aggregation device performs an IPv6 route lookup on a destination address of said IPv6 packet and forwards said packet to a next hop for said IPv6 packet, wherein each of the first aggregation device and second aggregation device performs the respective IPv6 route lookup when both the first aggregation device and second aggregation device are fully operational at the same time;

detecting, by a first one of said first aggregation device and said second aggregation device, an IST failure and instructions for modifying local IPv6 forwarding and Neighbor Discovery records to terminate IPv6 traffic sent to a second one of said first aggregation device and said second aggregation device; and transmitting by said first one of said first aggregation device and said second aggregation device, unsolicited Router Advertisement messages for all prefixes of said second one of said first aggregation device and said second aggregation device.

12. The system of claim 11 wherein said first aggregation device performs sub-second failover when said second aggregation device fails.

13. The system of claim 12 further comprising the process causing the first aggregation device to perform the operation of handling all packets received from and transferred to said second aggregation device by said first aggregation device.

14. The system of claim 12 further comprising the process causing the first aggregation device to perform the operation of terminating, by said first aggregation device, IPv6 packets on behalf of said second aggregation device when said second aggregation device fails.

15. The of system claim 11 further comprising the process causing the first aggregation device to perform the operation of receiving by said first aggregation device, a packet destined to one of said IPv6 addresses of said second aggregation device, and passing said packet to a local IPv6 protocol stack.

* * * * *